E. L. DELANY.
VALVE FOR FLUSH TANKS.
APPLICATION FILED DEC. 26, 1911.
1,077,457.
Patented Nov. 4, 1913.
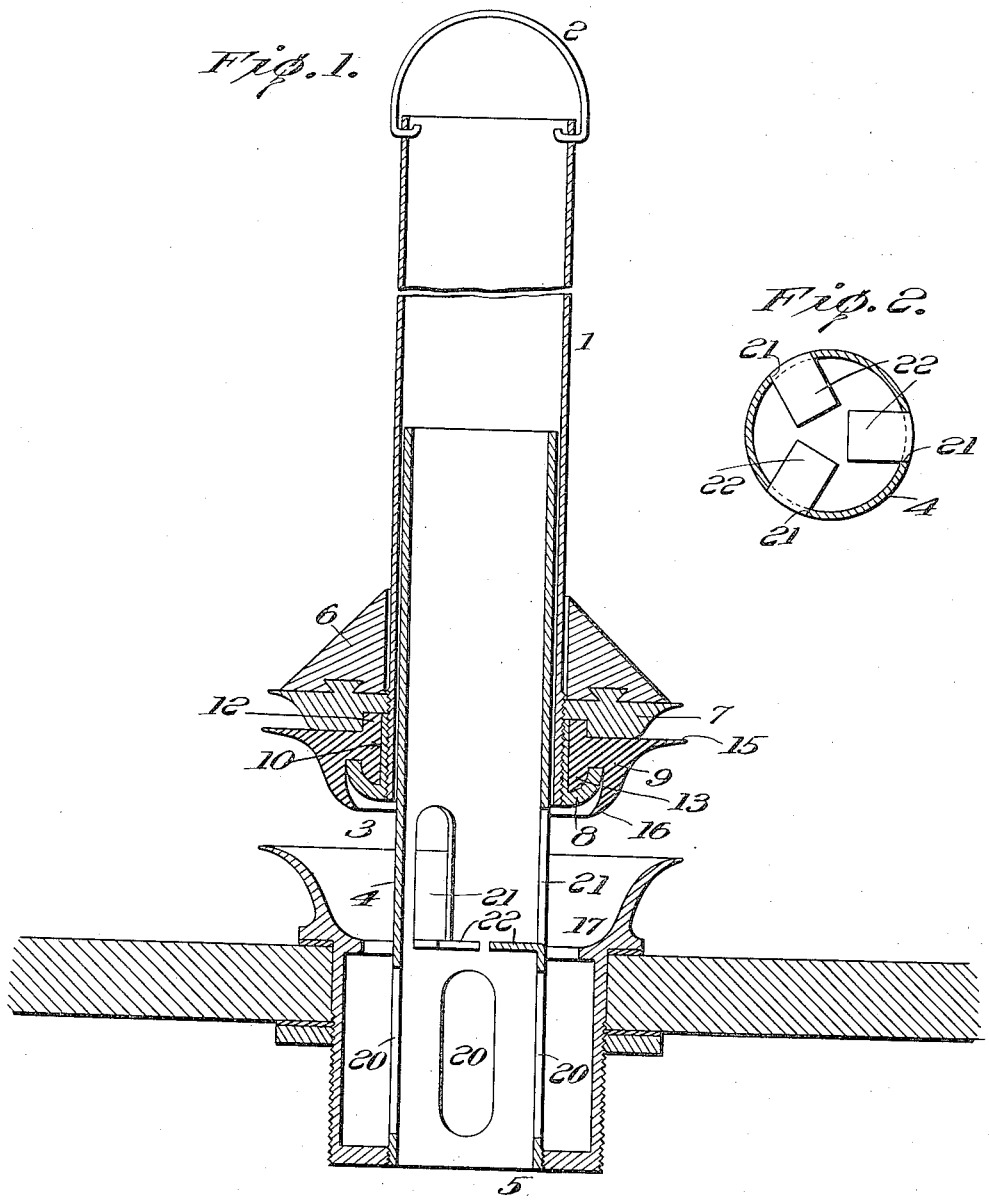

UNITED STATES PATENT OFFICE.

EDWARD L. DELANY, OF NEW YORK, N. Y.

VALVE FOR FLUSH-TANKS.

1,077,457.  Specification of Letters Patent.  Patented Nov. 4, 1913.

Application filed December 26, 1911. Serial No. 667,650.

*To all whom it may concern:*

Be it known that I, EDWARD L. DELANY, of the city of New York, in the county of Kings and State of New York, have invented certain new and useful Improvements in Valves for Flush-Tanks; and I do hereby declare the following to be a full, clear, and exact description of the invention, such as will enable others skilled in the art to which it appertains to make and use the same.

It has been found that the rubber washers with which these valves are provided become soft and stretch owing to their remaining immersed in water.

The primary object of my present invention is to provide a novel shape of washer and to make the valve and its seat of such formation that the pressure of one upon the other will tend to maintain the rubber in the proper shape to resist leaking.

Another object of my invention is to provide improved means for preventing the gurgling noise within the tank as its contents empty, due to air passing down the valve stem.

In the accompanying drawing Figure 1 is a vertical sectional view of the valve mechanism embodying my invention. Fig. 2 is a detail.

Referring to the drawing the vertically movable overflow tube 1 is shown provided with the customary bail 2 at its top and a valve 3 at its lower end. The tube 1 is shown movable on a hollow guide stem 4 fixed over the outlet 5 of the tank. The tube 1 carries a weight 6 such as a ring of lead to the lower face of which is secured a second ring 7 of hard metal such as brass.

8 is a sleeve screwed on the tube 1 and having a flange at its lower end turned upward and outward in the form illustrated.

The rubber washer 9 is of peculiar construction, its formation corresponding to that of ring 7 and sleeve 8, that is its inner vertical face 10 lies against the sleeve and it has a raised portion 12 at its top fitting in a groove in the ring 7 while its lower edge, as at 13 corresponds in shape to the flange of the sleeve. The outer edge of the washer has a substantially horizontal tapered portion 15 and a depending tapered portion 16 turned inward at its extremity and spaced from the sleeve 8 to insure its effective contact when the valve is seated. The outer edge of ring 7 is preferably slightly concave.

17 is the valve seat. As shown it is of flaring formation corresponding to the outer faces of the washer and flange 8 and ring 7.

By the construction described the rubber washer is provided with an enlarged inner portion securely held between the parts 7 and 8 and this portion is maintained virtually dry and therefore firm, while the extremities 15 and 16 have no force exerted upon them tending to affect their shape as their own contour corresponds to that of the valve elements 7 and 8 and the valve seat 17. The valve and its seat have extended contact surfaces which owing to their corresponding formations distribute the weight of the valve over the entire outer surface of the washer so that even when the latter becomes soft leakage is reduced to a minimum. The part 15 of the washer is always exposed to the water and part 16 is exposed only when the valve is open. Consequently the deleterious effect of the water does not reach the entire washer at once.

The hollow guide stem 4 is of peculiar design. In addition to the customary outlet apertures 20 near its lower end, the guide stem is formed with holes 21 above the apertures 20. The object of this second series of openings 21 is to admit a quantity of water into the stem and hold it there while the contents of the tank are passing down through outlet 5, this column of water within the stem preventing the passage of air through the latter and in consequence preventing the gurgling noise. It is not intended that the column of water shall remain in the stem but only that its passage therefrom shall be retarded until the tank has emptied. An appropriate means of attaining the purpose is to cut the wall of the stem to form the holes 21 and bend the tangs 22 inward. About three of these tangs extending radially inward will sufficiently retard the outlet of the column of water without preventing its ultimate escape.

I claim as my invention:—

1. In a flush tank valve, a two part valve element, and a washer having a shoulder held between said parts and having a lateral portion extending outward between said valve parts and formed with substantially horizontal and depending pliable tapering extremities, said depending portion being spaced apart from said valve, in combination with a valve seat of formation corresponding to that of the extremities of said washer, whereby said horizontal portion of said washer is normally immersed and said depending portion is immersed only when said valve is open.

2. In a flush tank valve, a two part valve element having its outer surface curved upward and outward, and a flaring valve seat corresponding in formation to that of said valve element, in combination with a washer held between said valve parts and having horizontal and depending portions corresponding in formation to said valve and said seat.

3. In a flush tank valve, the combination with the overflow tube and its valve and valve seat, said valve having a lateral flange, as 8, and a ring, as 7 on said tube above said flange, of a washer having an inner portion as 10 held by and between said flange and said ring and having an outward extending washer portion 15, and a depending washer portion 16 spaced apart from said flange 8.

In testimony whereof, I have signed this specification in the presence of two subscribing witnesses.

EDW. L. DELANY.

Witnesses:
GRAFTON L. MCGILL,
MARION I. BALFOUR.